US012397826B2

(12) United States Patent
Wu

(10) Patent No.: US 12,397,826 B2
(45) Date of Patent: Aug. 26, 2025

(54) METHOD AND APPARATUS FOR DETECTING DRIVABLE AREA, MOBILE DEVICE AND STORAGE MEDIUM

(71) Applicant: XIAOMI EV TECHNOLOGY CO., LTD., Beijing (CN)

(72) Inventor: Peng Wu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 17/871,522

(22) Filed: Jul. 22, 2022

(65) Prior Publication Data
US 2023/0278587 A1 Sep. 7, 2023

(30) Foreign Application Priority Data

Mar. 2, 2022 (CN) .......................... 202210200277.3

(51) Int. Cl.
B60W 60/00 (2020.01)
B60W 40/04 (2006.01)
(Continued)

(52) U.S. Cl.
CPC ........ B60W 60/0016 (2020.02); B60W 40/04 (2013.01); G06T 7/246 (2017.01);
(Continued)

(58) Field of Classification Search
CPC ............ B60W 60/0016; B60W 40/04; B60W 2420/403; G06T 7/246; G06T 2207/30241;
(Continued)

(56) References Cited

U.S. PATENT DOCUMENTS 11,753,005 B2* 9/2023 Zhu ...................... B60W 30/09
701/301
11,989,952 B2* 5/2024 Sun ................... G06F 18/24133
(Continued)

FOREIGN PATENT DOCUMENTS

CN 103954275 A * 7/2014 ............. G01C 21/30
CN 107976688 A 5/2018
(Continued)

OTHER PUBLICATIONS

English translation of CN-113298026-A (Year: 2021).*
(Continued)

Primary Examiner — Todd Melton
Assistant Examiner — Matthew Ho
(74) Attorney, Agent, or Firm — Cozen O'Connor

(57) ABSTRACT

A method for detecting a drivable area includes: collecting N consecutive video frames of a road when a vehicle is driving, where N is a positive integer greater than 1; determining a historical trajectory of a dynamic obstacle and position information of a static obstacle included in the N consecutive video frames by analyzing the N consecutive video frames with a 3D detection algorithm; correcting the historical trajectory and the position information based on a preset rule; determining a predicted trajectory of the dynamic obstacle based on the corrected historical trajectory; and determining the drivable area of the vehicle based on the predicted trajectory and the corrected position information.

19 Claims, 5 Drawing Sheets

(51) Int. Cl.
  *G06T 7/246* (2017.01)
  *G06V 20/58* (2022.01)
  *G08G 1/16* (2006.01)
(52) U.S. Cl.
  CPC ............. *G06V 20/58* (2022.01); *G08G 1/166* (2013.01); *B60W 2420/403* (2013.01); *G06T 2207/30241* (2013.01); *G06T 2207/30256* (2013.01); *G06T 2207/30261* (2013.01)
(58) Field of Classification Search
  CPC ........... G06T 2207/30256; G06T 2207/30261; G06V 20/58; G08G 1/166
  See application file for complete search history.

(56) References Cited

U.S. PATENT DOCUMENTS

| | | | | |
|---|---|---|---|---|
| 2015/0354976 | A1* | 12/2015 | Ferencz | G05D 1/0253 382/104 |
| 2021/0031760 | A1* | 2/2021 | Ostafew | G05D 1/0088 |
| 2021/0331679 | A1 | 10/2021 | Lilja et al. | |
| 2021/0349463 | A1* | 11/2021 | Kurotobi | B60W 30/18145 |
| 2021/0354699 | A1* | 11/2021 | Sugiyama | B60W 50/0097 |
| 2022/0256082 | A1* | 8/2022 | Namba | H04N 23/90 |
| 2023/0213663 | A1* | 7/2023 | Lim | G01S 19/40 |
| 2023/0288211 | A1* | 9/2023 | Rech | B60W 60/001 |
| 2024/0331391 | A1* | 10/2024 | Ogawa | G08G 1/00 |

FOREIGN PATENT DOCUMENTS

| | | | | |
|---|---|---|---|---|
| CN | 111091591 | A | | 5/2020 |
| CN | 112184751 | A * | 1/2021 | ............. G01D 21/02 |
| CN | 113298026 | A * | 8/2021 | ............. G01C 21/30 |
| EP | 3842994 | A1 | | 6/2021 |
| KR | 20050058810 | A * | 6/2005 | |
| WO | WO-2021134354 | A1 * | 7/2021 | |
| WO | WO-2022254535 | A1 * | 12/2022 | |

OTHER PUBLICATIONS

English translation of WO-2021134354-A1 (Year: 2021).*
English translation of WO-2022254535-A1 (Year: 2022).*
English translation of CN-103954275-A (Year: 2014).*
English translation of CN-112184751-A (Year: 2021).*
English translation of KR 20050058810 A (Year: 2005).*
European Patent Application No. 22187743.4, Search and Opinion dated Jul. 14, 2023, 10 pages.
Chinese Patent Application No. 202210200277.3 Office Action dated Mar. 28, 2025, with English translation 16 pages.

* cited by examiner

METHOD AND APPARATUS FOR DETECTING DRIVABLE AREA, MOBILE DEVICE AND STORAGE MEDIUM

CROSS REFERENCE TO RELATED APPLICATIONS

This application claims priority to Chinese Patent Application No. 202210200277.3, filed on Mar. 2, 2022, the entire content of which is incorporated herein by reference.

TECHNICAL FIELD

The disclosure relates to the field of automatic driving technology, and more particularly, to a method and an apparatus for detecting a drivable area, a mobile device and a storage medium.

BACKGROUND

In an automatic driving system, the distance perception of a surrounding object position and the prediction of a target moving trajectory are an important basis for decision-making and planning. The object here includes both a static object, such as a road boundary, a lane line, etc., and a dynamic obstacle, such as a vehicle, a pedestrian, etc. The road boundary and the obstacle boundary together constitute a boundary of a drivable area. The safety decision needs to ensure that a planned path is within a range of the drivable area. Therefore, the drivable area detection is a core module of the automatic driving perception system.

SUMMARY

According to a first aspect of the disclosure, a method for detecting a drivable area is provided. The method includes: collecting N consecutive video frames of a road when a vehicle is driving, where N is a positive integer greater than 1; determining a historical trajectory of a dynamic obstacle and position information of a static obstacle included in the N consecutive video frames by analyzing the N consecutive video frames with 3D detection algorithm; correcting the historical trajectory and the position information based on a preset rule; determining a predicted trajectory of the dynamic obstacle based on the corrected historical trajectory; and determining the drivable area of the vehicle based on the predicted trajectory and the corrected position information.

According to a second aspect of the disclosure, a mobile device is provided, including: a processor and a memory, configured to store with computer programs executable by the processor. The processor is configured to: obtain N consecutive video frames of a road collected when a vehicle is driving, where N is a positive integer greater than 1; determine a historical trajectory of a dynamic obstacle and position information of a static obstacle included in the N consecutive video frames by analyzing the N consecutive video frames with a 3D detection algorithm; correct the historical trajectory and the position information based on a preset rule; determine a predicted trajectory of the dynamic obstacle based on the corrected historical trajectory; and determine the drivable area of the vehicle based on the predicted trajectory and the corrected position information.

According to a third aspect of the disclosure, a non-transitory computer readable storage medium having instructions stored thereon, and when the instructions are executed by a processor, a method for detecting a drivable area is implemented. The method includes: collecting N consecutive video frames of a road when a vehicle is driving, where N is a positive integer greater than 1; determining a historical trajectory of a dynamic obstacle and position information of a static obstacle included in the N consecutive video frames by analyzing the N consecutive video frames with 3D detection algorithm; correcting the historical trajectory and the position information based on a preset rule; determining a predicted trajectory of the dynamic obstacle based on the corrected historical trajectory; and determining the drivable area of the vehicle based on the predicted trajectory and the corrected position information.

Additional aspects and advantages of the disclosure will be given in part in the following description, and some will become apparent from the following description, or learned through the practice of the disclosure.

BRIEF DESCRIPTION OF THE DRAWINGS

The above and/or additional aspects and advantages of the disclosure will become apparent and easy to understand from the following description of the embodiments in combination with the accompanying drawings.

DETAILED DESCRIPTION

Embodiments of the disclosure will be described in detail herein, examples of which are illustrated in the accompanying drawings, throughout which the same or similar reference numbers represent the same or similar elements or elements with the same or similar functions. The embodiments described below with reference to the accompanying drawings are exemplary and are for the purpose of explaining the disclosure, which may not be understood as limitations to the disclosure. On the contrary, the embodiments of the disclosure include all changes, modifications, and equivalents that fall within the substance of the appended claims.

It should be noted that an executive body of the method for detecting a drivable area according to this embodiment may be an apparatus for detecting a drivable area, which may be implemented in software and/or hardware.

In the related art, in a mainstream solution, a system for detecting a drivable area is based on a detection result of a single frame, without considering a dynamic change process of the drivable area at consecutive moments. In addition, in the related art, the detection result is not corrected and the optimization of front and back frames is not considered, so it is difficult to ensure the consistency of the static boundary, which may affect the accuracy of predicting a trajectory of the dynamic object and lead to the instability of the drivable area boundary at consecutive frames.

The method for detecting a drivable area according to the embodiment of the disclosure is configured to be executed, for example, in an electronic device. The electronic device may be a hardware device with various operating systems and imaging devices, such as a mobile phone, a tablet computer, a personal digital assistant, a wearable device, a vehicle-mounted terminal, and one or more third-party applications (APPs) may be installed on the operating systems of the electronic device.

Figure 1:
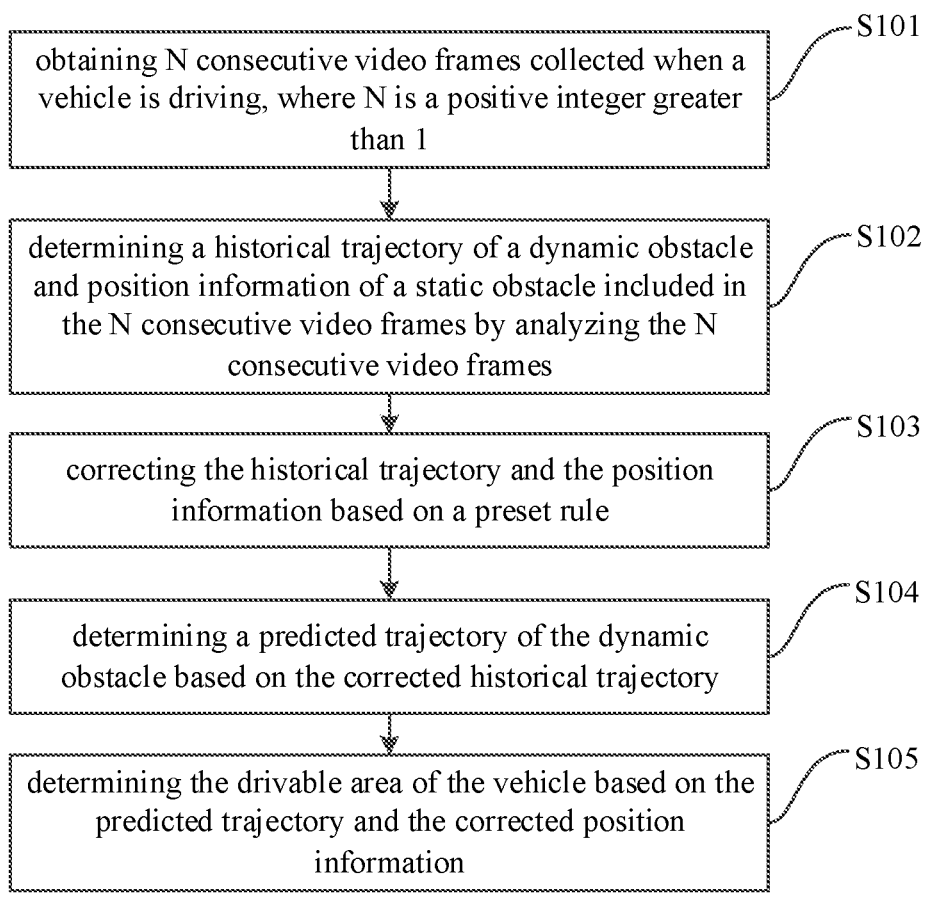
FIG. 1 is a flow diagram of a method for detecting a drivable area according to an embodiment of the disclosure.

FIG. 1 is a flow diagram of a method for detecting a drivable area according to an embodiment of the disclosure. As shown in FIG. 1, the method for detecting a drivable area includes the following steps at S101-S105.

At S101, N consecutive video frames collected when a vehicle is driving are obtained, where N is a positive integer greater than 1.

The vehicle in the embodiment of the disclosure may be a vehicle that supports automatic driving. In the process of automatic driving, the vehicle may collect consecutive video frames of its driving road, and further calculate the video frames by an automatic driving system of the vehicle to realize automatic driving. In other words, the method for detecting a drivable area according to the embodiment of the disclosure may be performed by the automatic driving system. In an embodiment of the disclosure, the video frame may be collected by a camera device mounted on the vehicle, and there is communication connections between the camera and the vehicle such as via a bus.

In the embodiment of the disclosure, the automatic driving system first obtains N consecutive video frames collected before a current moment, where N is a positive integer greater than 1.

Figure 2:
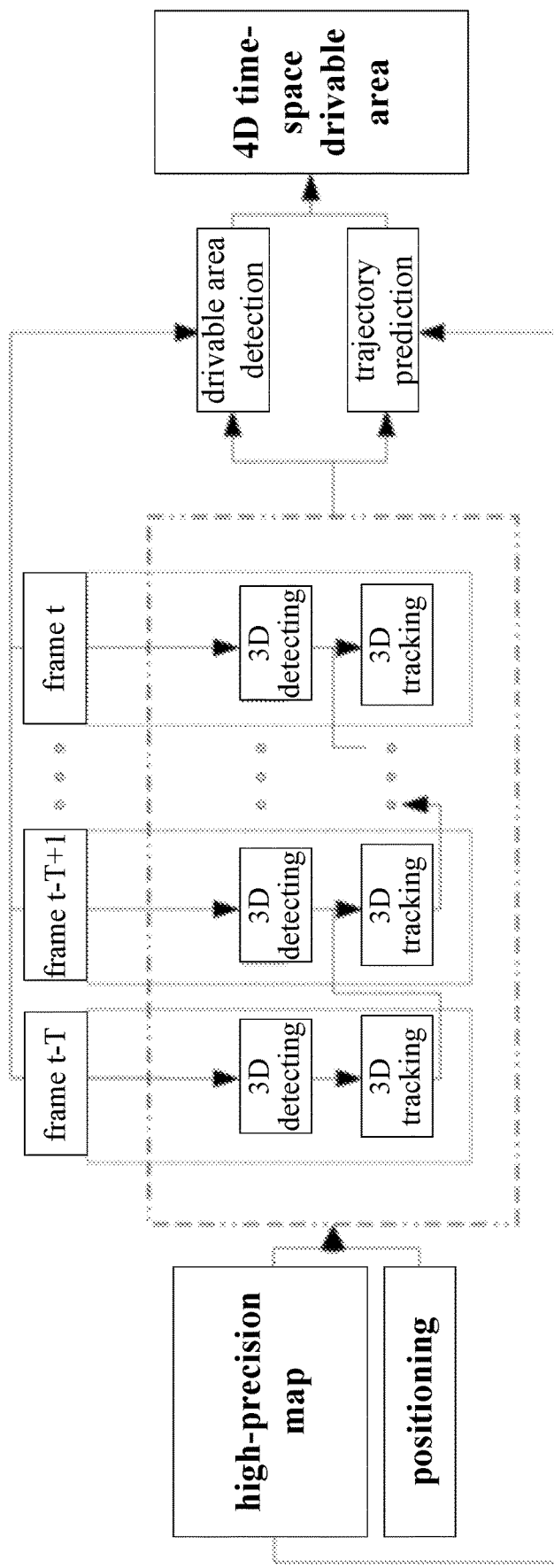
FIG. 2 is a schematic diagram of a process of detecting a drivable area according to an embodiment of the disclosure.

For example, FIG. 2 is a schematic diagram of a process of detecting a drivable area according to an embodiment of the disclosure. As shown in FIG. 2, the N consecutive video frames may be video frames collected for a period of time. For example, when the current moment is t, the length of a period of time is T, and a collection interval between two video frames is 1 second, the embodiment of the disclosure may obtain the N consecutive video frames collected from the moment t-T to the moment t, including: a frame at t-T, a frame at t-T+1, a frame at t-T+2, ..., a frame at t, in which the collection time interval T may be flexibly set according to the actual application scenarios, or the specific value of N may be set according to the application scenarios, which is not limited.

At S102, the N consecutive video frames are analyzed to determine a historical trajectory of a dynamic obstacle and position information of a static obstacle included in the N consecutive video frames.

After the N consecutive video frames are obtained, the automatic driving system may further determine the historical trajectory of the dynamic obstacle and the position information of the static obstacle included in the N consecutive video frames by analyzing the N consecutive video frames. The N consecutive video frames of the road when a vehicle is driving include the static obstacle and the dynamic obstacle. That is, the static obstacle and the dynamic obstacle may be located on the road.

A static object on a road lane of the automatic driving vehicle may be called a static obstacle, and there may be one or more static obstacle, such as lane lines, lane boundaries, fences, roadside parked vehicles and any other possible static objects, which are not limited. The information used to describe the position of static obstacle may be called position information, such as the position information of lane lines, the position information of lane boundaries, etc., which is not limited.

The obstacle moving on the road lane may be called a dynamic obstacle, and there may be one or more dynamic obstacle, such as other vehicles, pedestrians, animals and any other possible dynamic objects driving on the lane, which is not limited. The moving trajectory of the dynamic obstacle in the N consecutive video frames may be called a historical trajectory. For example, the trajectory of other vehicle from the moment t-T to the moment t may be called a historical trajectory.

In practical applications, as shown in FIG. 2, the automatic driving system may analyze each of the video frames separately. For example, a 3D detection algorithm is used to recognize the video frame to obtain a boundary of the static obstacle and a boundary of the dynamic obstacle. In the detection process, a unique identifier may be given for the same dynamic obstacle. Further, the dynamic obstacle in the N consecutive video frames is tracked according to the identifier to obtain the historical trajectory. In other words, the position of the dynamic obstacle with the same identifier in the N consecutive video frames may constitute the historical trajectory.

In some embodiments, it is also possible to determine positioning information of the vehicle when each video frame is collected, such as coordinate information. Further, the static obstacle and the dynamic obstacle in each video frame are converted into the world coordinate system according to the positioning information of the vehicle and the 3D detection result, to obtain a position of the obstacle in a real world at each moment. Further, the positions of the obstacle in multiple video frames are spliced in the world coordinate system to obtain a historical trajectory of the dynamic obstacle position information of the static obstacle. Thus, it is more intuitive and realistic to express the historical trajectory and position information in the world coordinate system and the accuracy of subsequently detecting a drivable area may be improved.

At 103, the historical trajectory and the position information are corrected based on a preset rule.

In practical applications, there may be errors between the historical trajectory and position information, and the real scene due to video frame collection errors, 3D detection errors and any other possible factors, such as, the historical trajectory is not smooth, the position information has false detection or mistake detection, etc.

In this case, the automatic driving system in the embodiment of the disclosure may correct the historical trajectory and the position information based on the preset rule. That is, parts of the historical trajectory and position information that have errors are corrected, so as to reduce the errors between the detection result and the actual scene and make the detection result more accurate.

In some embodiments, the preset rule may be arbitrary rule. For example, the preset rule may be that the correction is performed by using a map (i.e., a high-precision map), or may also be that the correction is performed based on other information, which is not limited.

At S104, a predicted trajectory of the dynamic obstacle is determined based on the corrected historical trajectory.

After the above historical trajectory and position information are corrected, the automatic driving system may further determine the predicted trajectory of the dynamic obstacle based on the corrected historical trajectory, in which the predicted trajectory may be one for a period of time in the future, such as, a predicted trajectory within 5 seconds after the current moment t, or the predicted trajectory at any time, which is not limited.

In some embodiments, the embodiments of the disclosure may train a trajectory prediction model in advance, and the model may be used to obtain the predicted trajectory by calculating the historical trajectory in the prediction process. The trajectory prediction model may be, for example, a cyclic neural network model, a convolutional neural network model, and any other possible artificial intelligence model, which is not limited.

In another embodiment, map information corresponding to the lane may also be fused in the process of model training. In the prediction process, the map information of continuous video frames may be encoded to obtain map coding information. Further, the map coding information and historical trajectory may be input to the trajectory prediction model as input information, and a plurality of prediction positions in the future may be output. Further, the plurality of prediction positions are spliced in order to obtain the predicted trajectory. In this embodiment, information such as curves, turns, straights, and vehicle interactions may be introduced by fusing map information, so as to constrain the predicted position and obtain a more accurate predicted trajectory.

At S105, the driving area of the vehicle is determined based on the predicted trajectory and the corrected position information.

That is to say, the area where the vehicle cannot drive may be obtained by superimposing the predicted trajectory of the dynamic obstacle and the position information of the static obstacle, while other areas of the lane may be used as the current drivable area of the vehicle. When the above drivable area is the world coordinate system area, the predicted trajectory may also be converted into the drivable area in a vehicle body coordinate system.

In this embodiment, the N consecutive video frames collected when the vehicle is driving are obtained, where N is a positive integer greater than 1; the historical trajectory of the dynamic obstacle and position information of the static obstacle included in the N consecutive video frames are determined by analyzing the N consecutive video frames; the historical trajectory and position information are corrected based on the preset rule; the predicted trajectory of the dynamic obstacle is determined based on the corrected historical trajectory; the drivable area of the vehicle is determined based on the predicted trajectory and the corrected position information. The position of the static obstacle and the trajectory of the dynamic obstacle in the continuous video frames may be corrected, which may improve the smoothness of static boundaries and the accuracy of dynamic trajectories, further improve the effect of detecting the drivable area and then improve the safety performance of automatic driving.

Figure 3:
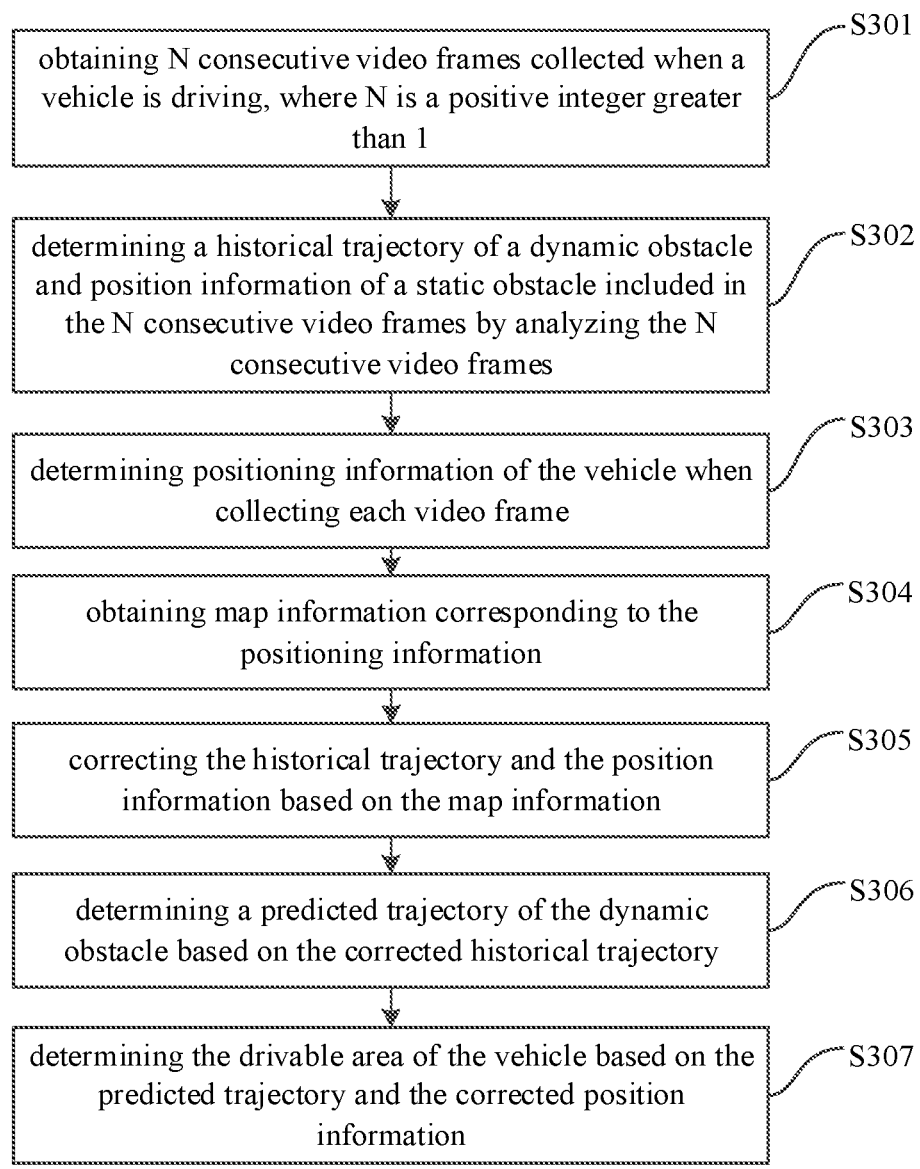
FIG. 3 is a flow diagram of a method for detecting a drivable area according to another embodiment of the disclosure.

FIG. 3 is a flow diagram of a method for detecting a drivable area according to another embodiment of the disclosure. As shown in FIG. 3, the method for detecting a drivable area includes the following steps at S301-S307.

At S301, N consecutive video frames collected when a vehicle is driving are obtained, where N is a positive integer greater than 1.

At S302, the N consecutive video frames are analyzed to determine a historical trajectory of a dynamic obstacle and position information of a static obstacle included in the N consecutive video frames.

The description of S301-S302 may be seen in the above embodiments, which will not be repeated here.

At S303, positioning information of the vehicle when collecting each video frame is determined.

In the operation of correcting the historical trajectory and position information based on the preset rule, the embodiment of the disclosure first determines the positioning information (e. g., coordinate information) of the vehicle when collecting each video frame. In some embodiments, the automatic driving vehicle may obtain the positioning information by a positioning system, such as a global positioning system (GPS), a Beidou positioning system or any other possible positioning system, which is not limited. The automatic driving vehicle may be positioned to obtain the positioning information once every video frame is collected.

At S304, map information corresponding to the positioning information is obtained.

That is to say, the map information of this position is obtained based on the positioning information, in which the map information may be two-dimensional map information or three-dimensional map information, and the automatic driving vehicle may obtain the map information by calling a map interface API, which is not limited.

At S305, the historical trajectory and the position information are corrected based on the map information.

Further, the automatic driving system may correct the historical trajectory and the position information based on the obtained map information.

In some embodiments, information of each key point for describing a road trajectory may be determined first based on the map information in the correction process. In other words, the road trajectory on the map information may be described by multiple key points.

For example, multiple key points on a straight line may be used to describe a straight road. For another example, for a curve, multiple key points with the same bending angle as the curve may be used to describe the trajectory of the curve.

Further, the historical trajectory and the position information are compared with information of each key point to determine the comparison result. That is, location points of the historical trajectory and position information in the world coordinate system are compared with location points of the road trajectory to obtain the comparison result, in which the comparison result may judge whether the trajectories are identical.

Further, the historical trajectory and the position information are corrected based on the comparison result.

In some embodiments, when a deviation between information of any point in the historical trajectory or position information and the corresponding key point information is less than a set threshold, the historical trajectory or the position information is not corrected.

For example, the key point information of a road trajectory represents for example a straight line, there is a position point in the historical trajectory that deviates from the straight line by 0.3 meters, and the set threshold may be for example 0.5 meters. In other words, the deviation between information of the deviation point in the historical trajectory and the corresponding key point information is less than the set threshold. In this case, the historical trajectory or position information may not be corrected.

In another embodiment, when the deviation between the information of any point in the historical trajectory or position information and the corresponding key point information is greater than the set threshold, the information of any point in the historical trajectory or position information is replaced with the corresponding key point information.

For example, the key point information of the road trajectory represents for example a straight line, there is a position point in the historical trajectory that deviates from the straight line by 0.3 meters, and the set threshold may be for example 0.2 meters. In other words, the deviation between information of the deviation point in the historical trajectory and the corresponding key point information is greater than the set threshold. In this case, this embodiment may replace the information of the deviation point in the historical trajectory or position information with information of a key point corresponding to the deviation point among the key points of the road trajectory, so as to realize the correction of the historical trajectory. It may be understood that the set threshold in the embodiment of the disclosure may be flexibly disposed according to the actual applications, which is not limited.

The above example illustrates the correction of historical trajectory and position information with the key point information. In practical applications, any other possible correction methods may be used for correction, which is not limited.

In the embodiment of the disclosure, the historical trajectory and position information may be corrected based on the key point information of the road trajectory, so that the corrected historical trajectory and position information are more in line with the actual road conditions. In addition, threshold judgment conditions may be introduced in the correction process to correct deviation points that exceed the threshold, without correcting all points, which may save computing resources.

At S306, a predicted trajectory of the dynamic obstacle is determined based on the corrected historical trajectory.

At S307, a driving area of the vehicle is determined based on the predicted trajectory and the corrected position information.

The description of S306-S307 may be referred in the above embodiments, which will not be repeated here.

In this embodiment, the N consecutive video frames collected when the vehicle is driving are obtained, where N is a positive integer greater than 1; the historical trajectory of the dynamic obstacle and position information of the static obstacle included in the N consecutive video frames are determined by analyzing the N consecutive video frames; the historical trajectory and position information are corrected based on the preset rule; the predicted trajectory of the dynamic obstacle is determined based on the corrected historical trajectory; the drivable area of the vehicle is determined based on the predicted trajectory and the corrected position information. The position of the static obstacle and the trajectory of the dynamic obstacle in the continuous video frames may be corrected, which may improve the smoothness of static boundaries and the accuracy of dynamic trajectories, further improve the effect of detecting the drivable area and then improve the safety performance of automatic driving. In addition, the historical trajectory and position information may be corrected based on the key point information of the road trajectory, so that the corrected historical trajectory and position information are more in line with the actual road situations. In addition, the threshold judgment conditions may be introduced in the correction process to correct the deviation points that exceed the threshold without correcting all points, which may save computing resources.

Figure 4:
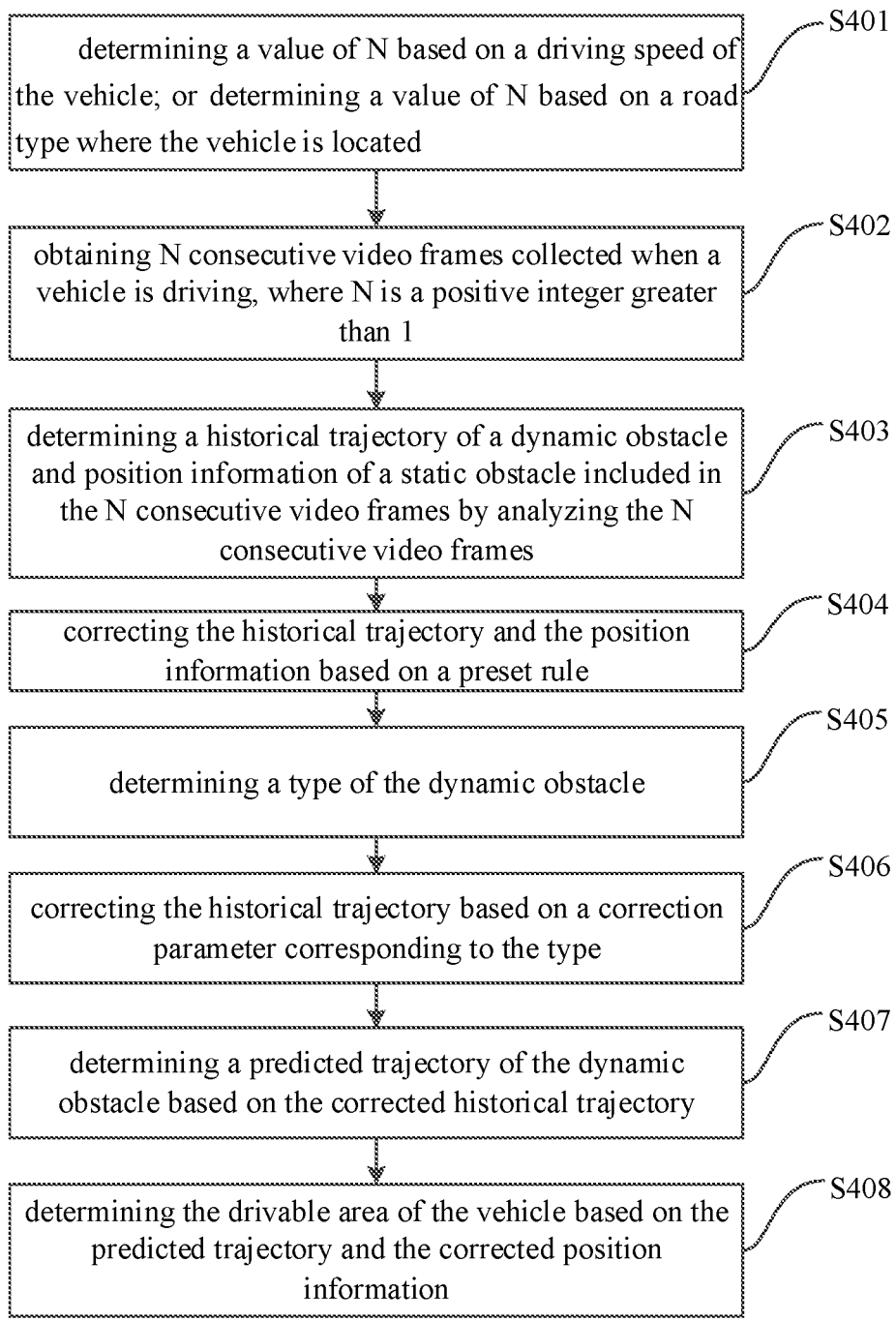
FIG. 4 is a flow diagram of a method for detecting a drivable area according to another embodiment of the disclosure.

FIG. 4 is a flow diagram of a method for detecting a drivable area according to another embodiment of the disclosure. As shown in FIG. 4, the method for detecting a drivable area includes the following steps at S401-S408.

At S401, a value of N is determined based on a driving speed of the vehicle or based on a current road type of the vehicle.

In practical applications, the automatic driving system may determine the number (i.e., the specific value of N) of continuous video frames obtained according to the actual situations of the vehicle.

In some embodiments, the drivable area detection of automatic driving is related to the driving speed. In this case, the value of N may be determined based on the driving speed of the vehicle.

For example, in the case of high driving speed, in order to ensure the safety of automatic driving, more continuous video frames may be obtained to predict the drivable area, that is, the value of N is as large as possible. In the case of slow driving speed, the risk of automatic driving is relatively low and a small number of continuous video frames may be obtained in consideration of the computing complexity, that is, the value of N is as small as possible. In practical applications, the driving speeds may be divided into different intervals, and different intervals correspond to different values of N. The speed interval may be determined based on the current driving speed of the automatic driving vehicle, and the value of N may be further determined based on the speed interval, so that the value of N may be quickly judged.

In another embodiment, the value of N may also be determined based on a road type where the vehicle is currently located. For example, the current road type is a wide road section (for example, a main road). In order to ensure the safety of automatic driving, more video frames may be obtained to predict the drivable area, that is, the value of N is as large as possible. For the road type being narrow, a small number of video frames may be obtained to predict the drivable area, that is, the value of N is as small as possible.

It may be understood that, the above example is an illustrative description of the value of N determined by the driving speed and the road type. In practical applications, other factors may also be used to determine the value of N, such as the number of obstacles, which is not limited.

Thus, this embodiment may determine the number of continuous video frames obtained according to the actual situations of vehicle driving, and may obtain a reasonable number of video frames, thus saving computing resources on the premise of ensuring the accuracy of prediction.

At S402, N consecutive video frames collected when a vehicle is driving are obtained, where N is a positive integer greater than 1.

At S403, the N consecutive video frames are analyzed to determine a historical trajectory of a dynamic obstacle and position information of a static obstacle included in the N consecutive video frames.

At S404, the historical trajectory and the position information are corrected based on a preset rule.

The description of S402-S404 may be referred in the above embodiments, which may not be repeated here.

At S405, a type of dynamic obstacle is determined.

The types of dynamic obstacles are, for example, vehicles, pedestrians and any other possible types, and the embodiment of the disclosure may further divide the types. For example, the types of vehicles may be divided into constant speed vehicles, accelerated vehicles, etc., and the types of dynamic obstacles are not limited here.

In the embodiment of the disclosure, after determining the historical trajectory of the dynamic obstacle, the type of the dynamic obstacle may also be determined. For example, each dynamic obstacle may be judged as either a pedestrian or a vehicle based on the 3D detection result, or may also be judged as either a constant speed vehicle or an accelerated vehicle based on the trajectory.

At S406, the historical trajectory is corrected based on a correction parameter corresponding to the type.

The corrected parameter may also be called a motion model, which is used to describe motion characteristics of the dynamic obstacle. Obstacles with different motion forms may have corresponding motion models (i.e., corrected parameters). For example, a constant speed vehicle may have a constant speed motion model, an accelerated vehicle may have an accelerated motion model, and a pedestrian may also have a corresponding motion model.

In this embodiment, after determining the type of dynamic obstacle, the corresponding correction parameter (i.e., motion model) may be determined based on the type, and the historical trajectory may be further corrected based on the correction parameter.

For example, the type of dynamic obstacle is a constant speed vehicle, and there is an acceleration trajectory in the historical trajectory of the dynamic obstacle. In this case, the embodiment of the disclosure may correct the acceleration trajectory in the historical trajectory based on the correction parameter corresponding to the constant speed vehicle, so as to make the historical trajectory more smooth and reasonable.

It may be understood that, this embodiment does not make specific restrictions on the execution sequence of steps at S405-S406 and S404.

At S407, a predicted trajectory of the dynamic obstacle is determined based on the corrected historical trajectory.

At S408, the driving area of the vehicle is determined based on the predicted trajectory and the corrected position information.

The description of S407-S408 may be referred in the above embodiments, which may not be repeated here.

In this embodiment, the N consecutive video frames collected when the vehicle is driving are obtained, where N is a positive integer greater than 1; the historical trajectory of the dynamic obstacle and position information of the static obstacle included in the N consecutive video frames are determined by analyzing the N consecutive video frames; the historical trajectory and position information are corrected based on the preset rule; the predicted trajectory of the dynamic obstacle is determined based on the corrected historical trajectory; the drivable area of the vehicle is determined based on the predicted trajectory and the corrected position information. The position of the static obstacle and the trajectory of the dynamic obstacle in the continuous video frames may be corrected, which may improve the smoothness of static boundaries and the accuracy of dynamic trajectories, further improve the effect of detecting the drivable area and then improve the safety performance of automatic driving. In addition, this embodiment may determine the number of continuous video frames obtained according to the actual situations of vehicle driving, and may obtain a reasonable number of video frames, thus saving computing resources on the premise of ensuring the accuracy of prediction.

Figure 5:
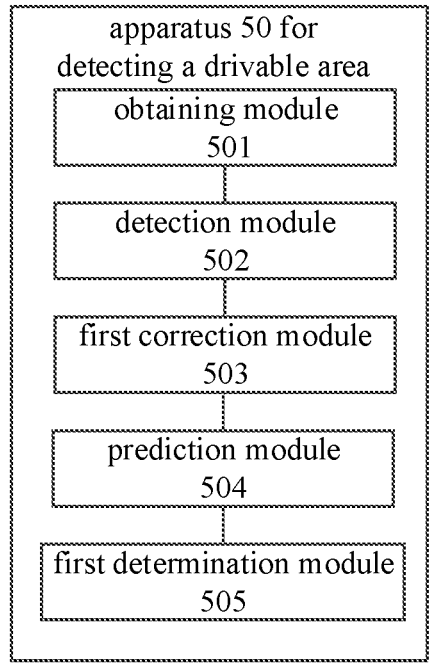
FIG. 5 is a structural diagram of an apparatus for detecting a drivable area according to another embodiment of the disclosure.

FIG. 5 is a structural diagram of an apparatus for detecting a drivable area according to another embodiment of the disclosure.

As shown in FIG. 5, the apparatus 50 for detecting a drivable area includes: an obtaining module 501, a detection module 502, a first correction module 503, a prediction module 504 and a first determination module 505.

The obtaining module 501 is configured to obtain N consecutive video frames collected when a vehicle is driving, where N is a positive integer greater than 1.

The detection module 502 is configured to determine a historical trajectory of a dynamic obstacle and position information of a static obstacle included in the N consecutive video frames by analyzing the N consecutive video frames.

The first correction module 503 is configured to correct the historical trajectory and the position information based on a preset rule.

The prediction module 504 is configured to determine a predicted trajectory of the dynamic obstacle based on the corrected historical trajectory.

The first determination module 505 is configured to determine the drivable area of the vehicle based on the predicted trajectory and the corrected position information.

In some embodiments, the first correction module 503 includes: a determination sub module, an obtaining sub module and a correction sub module.

The determination sub module is configured to determine positioning information of the vehicle when collecting each video frame.

The obtaining sub module is configured to obtain map information corresponding to the positioning information.

The correction sub module is configured to correct the historical trajectory and position information based on the map information.

In some embodiments, the correction sub module is specifically configured to: determine information of each key point for describing a road trajectory based on the map information; determine a comparison result by comparing the historical trajectory and the position information to the information of each key point; and correct the historical trajectory and the position information based on the comparison result.

In some embodiments, the correction sub module is specifically configured to: in response to a deviation between information of any point in the historical trajectory or position information and corresponding key point information being less than a set threshold, stopping correction of the historical trajectory or the position information; or in response to a deviation between information of any point in the historical trajectory or position information and corresponding key point information being larger than a set threshold, replacing the information of any point in the historical trajectory or position information with the corresponding key point information.

In some embodiments, the apparatus 50 also includes: a second determination module and a second correction module.

The second determination module is configured to determine a type of the dynamic obstacle.

The second correction module is configured to correct the historical trajectory based on a correction parameter corresponding to the type.

In some embodiments, the apparatus 50 also includes: a third determination module configured to determine a value of N based on a driving speed of the vehicle; or determine a value of N based on a road type where the vehicle is located.

In the embodiment of the disclosure, the N consecutive video frames collected when the vehicle is driving are obtained, where N is a positive integer greater than 1; the historical trajectory of the dynamic obstacle and position information of the static obstacle included in the N consecutive video frames are determined by analyzing the N consecutive video frames; the historical trajectory and position information are corrected based on the preset rule; the predicted trajectory of the dynamic obstacle is determined based on the corrected historical trajectory; the drivable area of the vehicle is determined based on the predicted trajectory and the corrected position information. The position of the static obstacle and the trajectory of the dynamic obstacle in the continuous video frames may be corrected, which may improve the smoothness of static boundaries and the accuracy of dynamic trajectories, further improve the effect of detecting the drivable area and then improve the safety performance of automatic driving.

Figure 6:
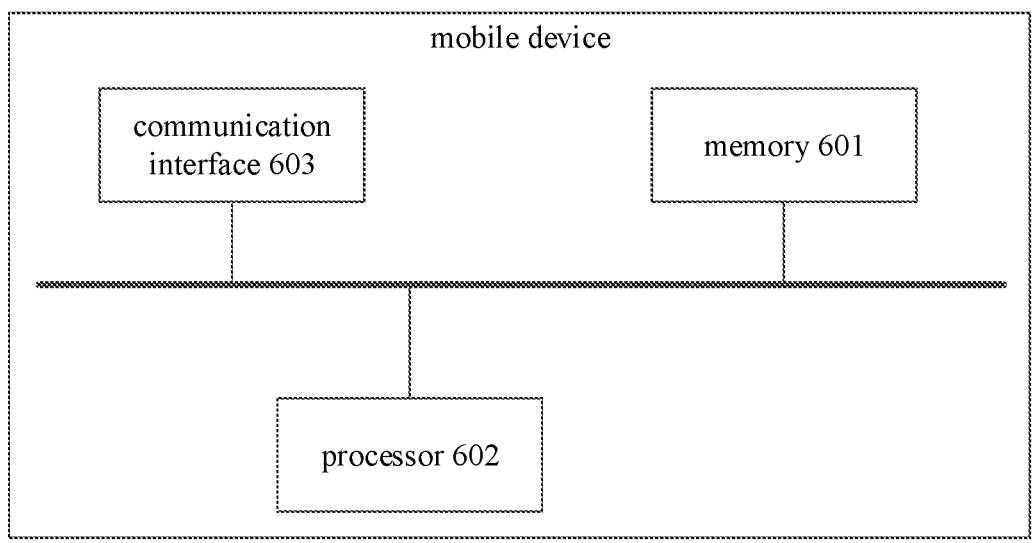
FIG. 6 is a structural diagram of a mobile device according to an embodiment of the disclosure.

FIG. 6 is a structural diagram of a mobile device according to an embodiment of the disclosure. The mobile device may be a vehicle, a mobile robot, etc.

The mobile device includes: a memory 601, a processor 602, and computer programs stored in the memory 601 and running on the processor 602. The processor 602 implements the method for detecting a drivable area in the above embodiment when the program is executed.

In a possible implementation, the mobile device also includes:
 a communication interface 603 for communication between the memory 601 and the processor 602.
 a memory 601 for storing computer programs that may be run on the processor 602.

The memory 601 may include a high-speed RAM memory, and may also include a non-volatile memory, such as at least one disk memory.

The processor 602 is configured to implement the method for detecting a drivable area in the above embodiment when the program is executed.

When the memory 601, the processor 602 and the communication interface 603 are implemented independently, the communication interface 603, the memory 601 and the processor 602 may be connected to each other via the bus and complete the communication between them. The bus may be an industry standard architecture (ISA) bus, a peripheral component (PCI) bus or an extended industry standard architecture (EISA) bus, etc. The bus may be divided into an address bus, a data bus, a control bus, etc. For ease of representation, one thick line is used in FIG. 6, but it does not mean that there is only one bus or one type of bus.

Optionally, in a specific implementation, when the memory 601, the processor 602 and the communication interface 603 are integrated on one chip, the memory 601, the processor 602 and the communication interface 603 may complete the communication between each other via an internal interface.

The processor 602 may be a central processing unit (CPU), an application specific integrated circuit (ASIC), or one or more integrated circuits configured to implement embodiments of the disclosure.

This embodiment also provides a computer-readable storage medium on which a computer program is stored. When the program is executed by a processor, the above method for detecting a drivable area is implemented.

In order to realize the above embodiments, the disclosure also provides a computer program product, which executes the method for detecting a drivable area shown in the above embodiments when the instructions in the computer program product are executed by a processor.

It should be noted that in the description of the disclosure, the terms "first", "second" and the like are used for descriptive purposes and may not be understood as indicating or implying relative importance. In addition, in the description of the disclosure, unless otherwise specified, "multiple" means two or more.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions, such as the above modules 501-505. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, which are directly or indirectly linked together, so as to perform a particular function.

Any process or method description in the flowchart or otherwise described herein may be understood as a module, a fragment or a part of code that represents executable instructions including one or more steps for implementing a particular logical function or process, and the scope of the preferred implementation of the disclosure includes additional implementations, which may not be in the order shown or discussed, which includes performing functions in a basically simultaneous manner or in a reverse order according to the involved functions, which should be understood by those skilled in the art to which the embodiments of the disclosure belong.

It should be understood that, parts of the disclosure may be implemented in hardware, software, firmware, or a combination thereof. In the above described embodiments, a plurality of steps or methods may be implemented with software or firmware stored in a memory and executed by a suitable instruction execution system. For example, when it is implemented in hardware, as in another embodiment, it may be implemented by any of the following technologies known in the art or their combination: discrete logic circuits with logic gate circuits for realizing logic function of data signal, application specific integrated circuits with appropriate combined logic gate circuits, programmable gate arrays (PGAs), field programmable gate arrays (FPGAs), etc.

Those skilled in the art may understand that all or part of the steps carried by the method of realizing the above embodiments may be completed by instructing the relevant hardware through a program, and the program may be stored in a computer-readable storage medium. When the program is executed, one or a combination of the steps of the method embodiments is implemented.

In addition, the functional units in various embodiments of the disclosure may be integrated in a processing module, or each unit may exist separately, or two or more units may be integrated in one module. The above integrated modules may be implemented in the form of hardware or software function modules. When the integrated module is realized in the form of software function module and sold or used as an independent product, it may also be stored in a computer-readable storage medium.

The storage medium mentioned above may be a read-only memory, a magnetic disk or an optical disk, etc.

In the description of this specification, the description referring to the terms "one embodiment", "some embodiments", "examples", "specific examples", or "some examples" means that the specific features, structures, materials, or features described in connection with the embodiments or examples are included in at least one embodiment or example of the disclosure. In this specification, the schematic expression of the above terms does not necessarily refer to the same embodiments or examples. Moreover, the specific features, structures, materials, or features described may be combined in a suitable manner in any one or more embodiments or examples.

Although the embodiments of the disclosure have been shown and described above, it may be understood that the above embodiments are exemplary and may not be understood as limitations of the disclosure. Those skilled in the art may change, modify, replace and modify the above embodiments within the scope of the disclosure.

The invention claimed is:

1. A method for detecting a drivable area, performed by an electronic device, comprising:
   determining a value of N based on a width of a road where a vehicle is located;
   after determining the value of N, collecting N consecutive video frames of the road when the vehicle is driving, where N is a positive integer greater than 1;
   determining a historical trajectory of a dynamic obstacle and position information of a static obstacle included in the N consecutive video frames by analyzing the N consecutive video frames with a 3D detection algorithm;
   correcting the historical trajectory and the position information based on a preset rule;
   determining a predicted trajectory of the dynamic obstacle based on the corrected historical trajectory;
   determining the drivable area of the vehicle based on the predicted trajectory and the corrected position information;
   performing automatic driving based on the determined drivable area; and
   determining a type of the dynamic obstacle, and correcting the historical trajectory based on a correction parameter corresponding to the type.

2. The method of claim 1, wherein correcting the historical trajectory and the position information based on the preset rule comprises:
   determining positioning information of the vehicle when collecting each of the video frames;
   obtaining map information corresponding to the positioning information; and
   correcting the historical trajectory and the position information based on the map information.

3. The method of claim 2, wherein a road trajectory comprises a plurality of key points, correcting the historical trajectory and the position information based on the map information comprises:
   determining information of each key point for describing a road trajectory based on the map information;
   determining a comparison result by comparing the historical trajectory and the position information to the information of each key point; and
   correcting the historical trajectory and the position information based on the comparison result.

4. The method of claim 3, wherein correcting the historical trajectory and the position information based on the comparison result comprises one of:
   in response to a deviation between information of any point in the historical trajectory or position information and corresponding key point information being less than a set threshold, stopping correction of the historical trajectory or the position information; and
   in response to a deviation between information of any point in the historical trajectory or position information and corresponding key point information being larger than a set threshold, replacing the information of any point in the historical trajectory or position information with the corresponding key point information.

5. The method of claim 1, wherein determining the predicted trajectory of the dynamic obstacle comprises:
   obtaining map coding information by encoding map information corresponding to a road lane;
   obtaining a plurality of prediction positions by inputting the map coding information and the historical trajectory into a trajectory prediction model trained in advance; and
   determining the predicted trajectory of the dynamic obstacle by splicing the plurality of prediction positions in order.

6. The method of claim 1, wherein determining the historical trajectory of the dynamic obstacle and position information of the static obstacle comprises:
   determining coordinate information of the vehicle when collecting each of the video frames;
   obtaining a position of the static obstacle and a position of the dynamic obstacle in a real world at each moment corresponding to each of the video frames, by converting the static obstacle and the dynamic obstacle into a world coordinate system according to the positioning information of the vehicle and a 3D detection result; and
   obtaining the historical trajectory of the dynamic obstacle by splicing the positions of the dynamic obstacle in the world coordinate system, and obtaining the position information of the static obstacle by splicing the positions of the static obstacle in the world coordinate system.

7. The method of claim 1, wherein determining the value of N further comprises:
   determining a current driving speed of the vehicle;
   determining a speed interval corresponding to the current driving speed; and
   determining the value of N matching the speed interval, wherein a correspondence between speed intervals and values of N is preset in the vehicle.

8. A mobile device, comprising:
   a processor coupled; and
   a memory storing non-transitory computer-readable instructions that, when executed by the processor, control the processor to
   determine a value of N based on a width of a road where the vehicle is located;
   after determining the value of N, receive N consecutive video frames of the road collected when a vehicle is driving, where N is a positive integer greater than 1;
   determine a historical trajectory of a dynamic obstacle and position information of a static obstacle included in the N consecutive video frames by analyzing the N consecutive video frames with a 3D detection algorithm;
   correct the historical trajectory and the position information based on a preset rule;
   determine a predicted trajectory of the dynamic obstacle based on the corrected historical trajectory;
   determine a drivable area of the vehicle based on the predicted trajectory and the corrected position information; and
   perform automatic driving based on the determined drivable area;

wherein the processor is further configured to: determine a type of the dynamic obstacle, and correct the historical trajectory based on a correction parameter corresponding to the type.

9. The mobile device of claim 8, wherein the processor is further configured to:
   determine positioning information of the vehicle when collecting each of the video frames;
   obtain map information corresponding to the positioning information; and
   correct the historical trajectory and the position information based on the map information.

10. The mobile device of claim 9, wherein a road trajectory comprises a plurality of key points, the processor is further configured to:
    determine information of each key point for describing a road trajectory based on the map information;
    determine a comparison result by comparing the historical trajectory and the position information to the information of each key point; and
    correct the historical trajectory and the position information based on the comparison result.

11. The mobile device of claim 10, wherein the processor is further configured to perform one of:
    in response to a deviation between information of any point in the historical trajectory or position information and corresponding key point information being less than a set threshold, stopping correction of the historical trajectory or the position information; and
    in response to a deviation between information of any point in the historical trajectory or position information and corresponding key point information being larger than a set threshold, replacing the information of any point in the historical trajectory or position information with the corresponding key point information.

12. The mobile device of claim 8, wherein the processor is further configured to:
    obtain map coding information by encoding map information corresponding to a road lane;
    obtain a plurality of prediction positions by inputting the map coding information and the historical trajectory into a trajectory prediction model trained in advance; and
    determine the predicted trajectory of the dynamic obstacle by splicing the plurality of prediction positions in order.

13. The mobile device of claim 8, wherein the processor is further configured to:
    determine coordinate information of the vehicle when collecting each of the video frames;
    obtain a position of the static obstacle and a position of the dynamic obstacle in a real world at each moment corresponding to each of the video frames, by converting the static obstacle and the dynamic obstacle into a world coordinate system according to the positioning information of the vehicle and a 3D detection result; and
    obtain the historical trajectory of the dynamic obstacle by splicing the positions of the dynamic obstacle in the world coordinate system, and obtain the position information of the static obstacle by splicing the positions of the static obstacle in the world coordinate system.

14. The mobile device of claim 8, wherein the processor is further configured to:
    determine a current driving speed of the vehicle;
    determine a speed interval corresponding to the current driving speed; and
    determine the value of N matching the speed interval, wherein a correspondence between speed intervals and values of N is preset in the vehicle.

15. A non-transitory computer readable storage medium having instructions stored thereon, wherein when the instructions are executed by a processor of an electronic device, the electronic device is caused to execute a method for detecting a drivable area, the method comprising:
    determining a value of N based on a width of a road where a vehicle is located;
    after determining the value of N, collecting N consecutive video frames of the road when the vehicle is driving, where N is a positive integer greater than 1;
    determining a historical trajectory of a dynamic obstacle and position information of a static obstacle included in the N consecutive video frames by analyzing the N consecutive video frames with a 3D detection algorithm;
    correcting the historical trajectory and the position information based on a preset rule;
    determining a predicted trajectory of the dynamic obstacle based on the corrected historical trajectory;
    determining the drivable area of the vehicle based on the predicted trajectory and the corrected position information; and
    performing automatic driving based on the determined drivable area;
    wherein the method further comprises: determining a type of the dynamic obstacle, and correcting the historical trajectory based on a correction parameter corresponding to the type.

16. The storage medium of claim 15, wherein correcting the historical trajectory and the position information based on the preset rule comprises:
    determining positioning information of the vehicle when collecting each of the video frames;
    obtaining map information corresponding to the positioning information; and
    correcting the historical trajectory and the position information based on the map information.

17. The storage medium of claim 16, wherein a road trajectory comprises a plurality of key points, correcting the historical trajectory and the position information based on the map information comprises:
    determining information of each key point for describing a road trajectory based on the map information;
    determining a comparison result by comparing the historical trajectory and the position information to the information of each key point; and
    correcting the historical trajectory and the position information based on the comparison result.

18. The storage medium of claim 17, wherein correcting the historical trajectory and the position information based on the comparison result comprises one of:
    in response to a deviation between information of any point in the historical trajectory or position information and corresponding key point information being less than a set threshold, stopping correction of the historical trajectory or the position information; and
    in response to a deviation between information of any point in the historical trajectory or position information and corresponding key point information being larger than a set threshold, replacing the information of any point in the historical trajectory or position information with the corresponding key point information.

19. The storage medium of claim 15, wherein determining the predicted trajectory of the dynamic obstacle comprises:
   obtaining map coding information by encoding map information corresponding to a road lane;
   obtaining a plurality of prediction positions by inputting the map coding information and the historical trajectory into a trajectory prediction model trained in advance; and
   determining the predicted trajectory of the dynamic obstacle by splicing the plurality of prediction positions in order.

\* \* \* \* \*